(12) United States Patent
Ito et al.

(10) Patent No.: US 7,085,055 B2
(45) Date of Patent: Aug. 1, 2006

(54) DIFFRACTIVE OPTICAL SYSTEM

(75) Inventors: Kimio Ito, Tokyo (JP); Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/934,315

(22) Filed: Sep. 3, 2004

(65) Prior Publication Data

US 2005/0207011 A1   Sep. 22, 2005

(30) Foreign Application Priority Data

Sep. 3, 2003   (JP)   ............................. 2003-311036

(51) Int. Cl.
*G02B 27/44* (2006.01)
(52) U.S. Cl. .................... 359/565; 359/566; 359/569
(58) Field of Classification Search ............... 359/565, 359/566, 569, 558
See application file for complete search history.

(56) References Cited

U.S. PATENT DOCUMENTS

| 5,208,629 A | * | 5/1993 | Matsuo et al. | ................. 355/53 |
| 6,577,403 B1 | * | 6/2003 | Primot et al. | ................ 356/521 |
| 2002/0135847 A1 | * | 9/2002 | Nagasaka et al. | ........... 359/204 |

* cited by examiner

*Primary Examiner*—Fayez G. Assaf
(74) *Attorney, Agent, or Firm*—Dellett & Walters

(57) ABSTRACT

The invention relates to a diffractive optical system having a two-dimensional structure, which can be used as a phase shift mask for the fabrication of an optical element having a two-dimensional fine periodic structure, and a two-dimensional light beam splitter. The diffractive optical system 10 comprises a transparent substrate surface 1 that is divided in alignment with orthogonal two directions into minuscule square cell groups 2, 3 of the same shape in a checked pattern. The square cells that give a phase $2p\pi$ and a phase $\{(2q+1)\pi \pm \delta\pi\}$ where $0 \leq \delta \leq 0.25$ and p and q are each an integer with respect to reference-wavelength light striking vertically on the transparent substrate surface 1 are alternately arranged in each direction, and the phase $2p\pi$-giving square cells and the phase $\{(2q+1)\pi \pm \delta\pi\}$-giving square cells are located in such a way as to be in alignment with 45° diagonal directions of said two directions.

9 Claims, 13 Drawing Sheets

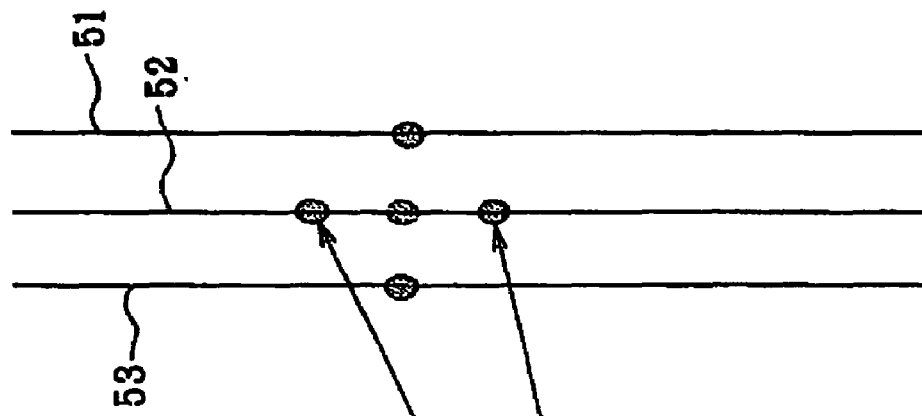
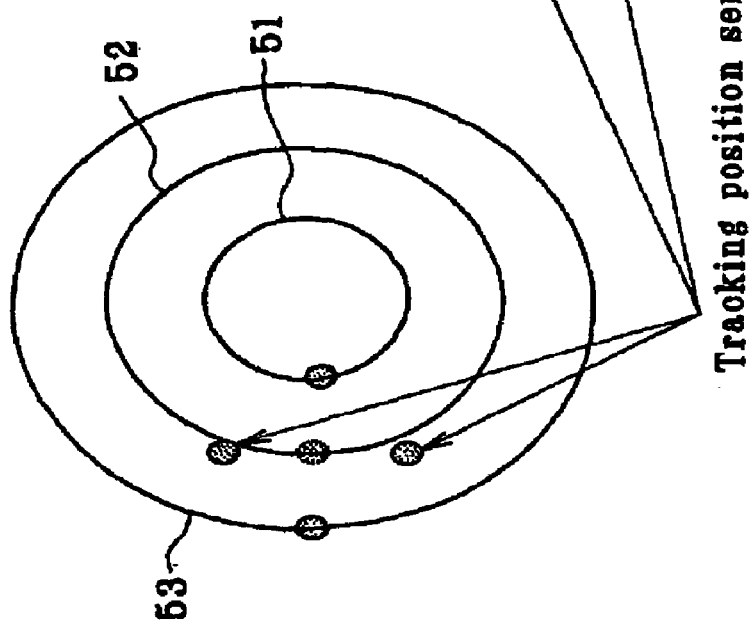

DIFFRACTIVE OPTICAL SYSTEM

BACKGROUND OF THE INVENTION

The present invention relates generally to a diffractive optical system, and more particularly to a diffractive optical system that can be used as an optical device such as a phase shift mask for fabrication of optical elements having a fine periodic structure, and a light beam splitter.

As well known typically from patent publication 1, a phase type diffraction grating is used as a light beam splitter. As also known typically from patent publication 2, exposure of a fine structure using a phase shift mask having a phase structure is practiced in the form of an phase shift mask.
Patent Publication 1
JP(A)7-140311
Patent Publication 2
JP(A)5-134389
Non-Patent Publication 1
"Optics", Vol. 32, No. 8 (2003), pp. 489–491

SUMMARY OF THE INVENTION

In view of such the state of prior art as described above, the present invention has for its object the provision of a diffractive optical system having a two-dimensional structure, which can have applications as a phase shift mask for the fabrication of an optical element having a two-dimensional, fine periodic structure, and a two-dimensional light beam splitter.

According to the invention, there is provided a diffractive optical system, characterized by comprising a transparent substrate that is divided at a surface in alignment with orthogonal two directions into minuscule square cell groups of the same shape in a checked pattern, wherein square cells that give a phase $2p\pi$ and a phase $\{(2q+1)\pi\pm\delta\pi\}$ where $0\leq\delta\leq0.25$ and p and q are each an integer with respect to reference-wavelength light striking vertically on the surface of the transparent substrate are alternately arranged in each direction, and the phase $2p\pi$-giving square cells and the phase $\{(2q+1)\pi\pm\delta\pi\}$-giving square cells are located in alignment with 45° diagonal directions of said two directions.

The diffractive optical system of the invention may be used as a beam splitter for splitting light striking vertically on the transparent substrate into four or five light beams.

The diffractive optical system of the invention may be used not just as means for generating four or five light beams for tracking control for a read head of an optical recording medium wherein information is recorded along concentric or spiral tracks, but also as means for generating four or five light beams for generation of tracking position sensor signals for a read head of an optical recording medium wherein information is recorded along concentric or spiral tracks.

The diffractive optical system of the invention may also be used as a phase shift mask for generation of an array of exposure profiles matching with a two-dimensional fine periodic structure.

Such a two-dimensional fine periodic structure, for instance, include is a micro-lens array, an antireflection structure, and a photonic crystal.

The diffractive optical system of the invention—comprising a transparent substrate that is divided at a surface in alignment with orthogonal two directions into minuscule square cell groups of the same shape in a checked pattern, wherein square cells that give a phase $2p\pi$ and a phase $\{(2q+1)\pi\pm\delta\pi\}$ where $0\leq\delta\leq0.25$ and p and q are each an integer with respect to reference-wavelength light striking vertically on the surface of the transparent substrate are alternately arranged in each direction, and the phase $2p\pi$-giving square cells and the phase $\{(2q+1)\pi\pm\delta\pi\}$-giving square cells are located in alignment with 45° diagonal directions of said two directions—may be used as means for generating four or five light beams for tracking control for a read head of an optical recording medium wherein information is recorded along concentric or spiral tracks, and as means for generating four or five light beams for generation of tracking position sensor signals for a read head of an optical recording medium wherein information is recorded along concentric or spiral tracks.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 6(*a*) and 6(*b*) are illustrative of why the inventive beam splitter can be used for generation of tracking position sensor signals.

DESCRIPTION OF THE PREFERRED EMBODIMENTS

The principles and embodiments of the diffractive optical system according to the invention are now explained with reference to the accompanying drawings.

Figure 1A:
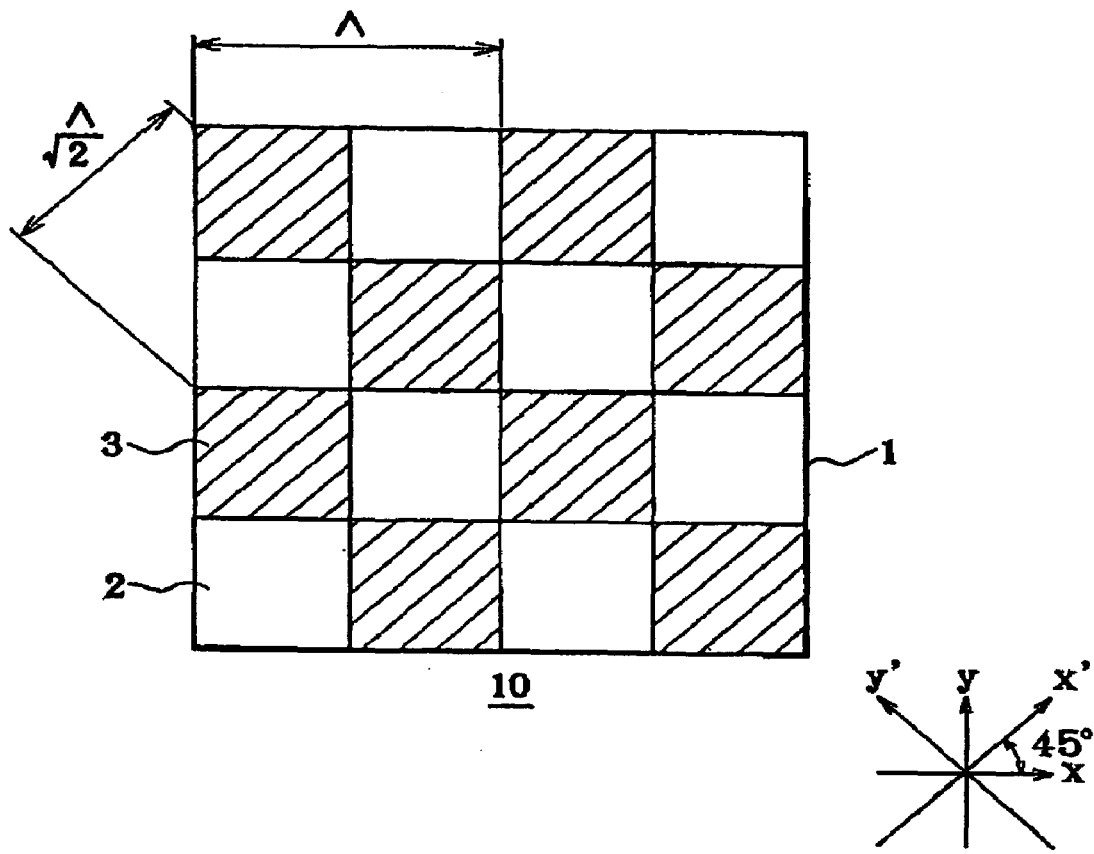
FIGS. 1(a) and 1(b) are a plan view and a perspective view, respectively, of one fundamental arrangement of the diffractive optical system according to the invention.
Figure 1B:
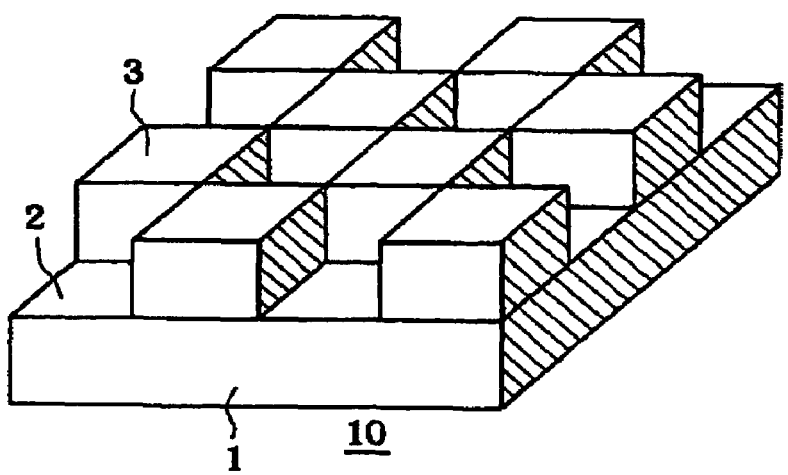

FIGS. 1(*a*) and 1(*b*) are a plan view and a perspective view, respectively, of the fundamental arrangement of a diffractive optical system 10 according to the invention. The diffractive optical system 10 comprises a transparent substrate 1 on the surface of which an array of minute square cells 2, 3 of the same shape are arranged as a grid pattern in alignment with both x- and y-axe directions that are here defined as being orthogonal to the surface of the transparent substrate 1. More specifically, the square cells 2 that give phase zero to light of a reference wavelength $\lambda_0$ striking vertically on the transparent substrate 1 and the square cells 3 that give phase $\pi$ to that light are alternately arranged in the respective x- and y-axis directions. Then, the square cells 2 and 3 that give phases zero and $\pi$, respectively, to the light are arranged in alignment with both x'- and y'-axis directions that are here defined as being mutually orthogonal, diagonal directions at 45° and 135° between the x-axis and the y-axis. Thus, the square cells 2 and 3 form together a so-called checked pattern. Here given that the repetitive pitch of the square cells 2 or 3 in the x- and y-axis directions is $\Lambda$, the repetitive pitch of the square cells 2 or 3 in the diagonal x'- and y'-axis directions becomes $\Lambda/\sqrt{2}$.

Figure 2:
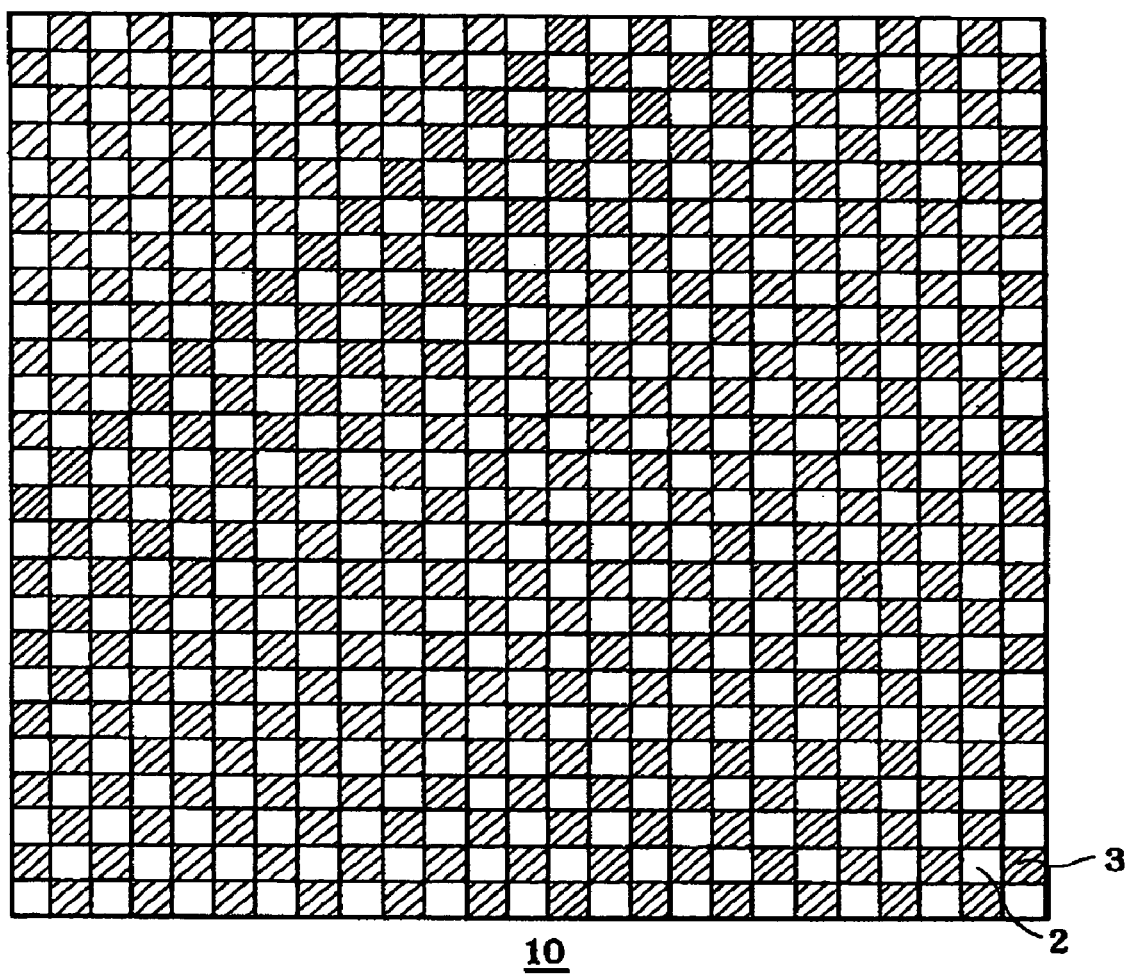
FIG. 2 is a plan view of one embodiment of a practically available diffractive optical system.

FIG. 2 is a plan view of a practical diffractive optical system 10, wherein the repetitive pitch of cells in the orthogonal (x- and y-axis) directions is $\Lambda=4$ mm and that in the diagonal (x'- and y'-axis) directions is $\Lambda/\sqrt{2}=4/\sqrt{2}$ μm=$2\sqrt{2}$ μm, with a reference wavelength $\lambda_0=800$ nm.

As light 20 having a wavelength $\lambda_0$ strikes vertically on the transparent substrate of the thus constructed diffractive optical system 10, four diffracted light beams $21_{+1x'}$, $21_{-1x'}$, $21_{+1y'}$ and $21_{-1y'}$ leave the diffractive optical system 10 from its opposite side. However, it is noted that the directions of diffraction are the diagonal x'- and y'-axis directions rather than the orthogonal two x- and y-axis directions; there are + first-order light $21_{+1x'}$, + first-order light $21_{+1y'}$ and − first-order light $21_{-1x'}$, − first-order light $21_{-1y'}$ in the respective directions. As can be seen from the diffraction equation, the angle of diffraction θ to the normal to the transparent substrate 1 of the diffractive optical system 10 has a relation of θ=arcsin $\{\lambda_0/(\Lambda/29 \sqrt{2})\}$ with respect to four such diffracted light beams $21_{+1x'}$, $21_{-1x'}$, $21_{+1y'}$ and $21_{-1y'}$. When $\lambda_0=0.8$ μm in FIG. 2, the angle of diffraction becomes θ=16.43°. However, it is noted that the + first-order light and the − first-order light have as a matter of course opposite signs in either of the x'- and y'-axis directions.

A possible reason for why the diffracted light leaves in the orthogonal, diagonal x'- and y'-axis directions could be that linear portions (one-dimensional phase diffraction gratings) where the phase zero- and phase π-giving square cells 2, and 3 are continuously linked together appears repeatedly in the diagonal x'- and y'-axis directions, respectively. The absence of zero-order diffracted light could also be due to the fact that the area of the phase zero-giving square cells 2 is equal to that of the phase π-giving square cells 3 all over the surface of the diffractive optical system 10; at a position far away from the diffractive optical system 10, a light component that transmits through the square cells 2 without being diffracted and a light component that transmits through the square cells 3 without being diffracted are canceled out each other. Higher-order light of odd degree, too, is slightly diffracted (there is no diffracted light of even degree); however, that diffracted light is negligible for normal use, because of being relatively faint with respect to the + first-order light $21_{+1x'}$, $21_{+1y'}$ and the − first-order light $21_{-1x'}$, $21_{-1y'}$, as shown in Table 1, given below.

In Table 1 with the x-axis direction as abscissa and the y-axis direction as ordinate, the numbers are indicative of degree. The above four diffracted light beams $21_{+1x'}$, $21_{-1x'}$, $21_{+1y'}$ and $21_{-1y'}$ correspond to (+1, +1) degree, (−1, −1) degree, (−1, +1) degree and (+1, −1) degree, respectively, and given that the intensity of the incident light 20 is 100%, the intensity of each light beam becomes 16.43%. From Table 1, it is understood that the intensity of high-order light of odd degree is relatively weak with respect to the + first-order light $21_{+1x'}$, $21_{+1y'}$ and the − first-order light $21_{-1x'}$, $21_{-1y'}$.

TABLE 1

| Diffraction efficiency | | | | | | | | | |
|---|---|---|---|---|---|---|---|---|---|
| Degree | -8 | -7 | -6 | -5 | -4 | -3 | -2 | -1 | 0 |
| -8 | 0.00% | 0.00% | 0.00% | 0.00% | 0.00% | 0.00% | 0.00% | 0.00% | 0.00% |
| -7 | 0.00% | 0.01% | 0.00% | 0.01% | 0.00% | 0.04% | 0.00% | 0.34% | 0.00% |
| -6 | 0.00% | 0.00% | 0.00% | 0.00% | 0.00% | 0.00% | 0.00% | 0.00% | 0.00% |
| -5 | 0.00% | 0.01% | 0.00% | 0.03% | 0.00% | 0.07% | 0.00% | 0.66% | 0.00% |
| -4 | 0.00% | 0.00% | 0.00% | 0.00% | 0.00% | 0.00% | 0.00% | 0.00% | 0.00% |
| -3 | 0.00% | 0.04% | 0.00% | 0.07% | 0.00% | 0.20% | 0.00% | 1.83% | 0.00% |
| -2 | 0.00% | 0.00% | 0.00% | 0.00% | 0.00% | 0.00% | 0.00% | 0.00% | 0.00% |
| -1 | 0.00% | 0.34% | 0.00% | 0.66% | 0.00% | 1.83% | 0.00% | ▓▓▓▓ | 0.00% |
| 0 | 0.00% | 0.00% | 0.00% | 0.00% | 0.00% | 0.00% | 0.00% | 0.00% | 0.00% |
| 1 | 0.00% | 0.34% | 0.00% | 0.66% | 0.00% | 1.83% | 0.00% | ▓▓▓▓ | 0.00% |
| 2 | 0.00% | 0.00% | 0.00% | 0.00% | 0.00% | 0.00% | 0.00% | 0.00% | 0.00% |
| 3 | 0.00% | 0.04% | 0.00% | 0.07% | 0.00% | 0.20% | 0.00% | 1.83% | 0.00% |
| 4 | 0.00% | 0.00% | 0.00% | 0.00% | 0.00% | 0.00% | 0.00% | 0.00% | 0.00% |
| 5 | 0.00% | 0.01% | 0.00% | 0.03% | 0.00% | 0.07% | 0.00% | 0.66% | 0.00% |
| 6 | 0.00% | 0.00% | 0.00% | 0.00% | 0.00% | 0.00% | 0.00% | 0.00% | 0.00% |
| 7 | 0.00% | 0.01% | 0.00% | 0.01% | 0.00% | 0.04% | 0.00% | 0.34% | 0.00% |
| 8 | 0.00% | 0.00% | 0.00% | 0.00% | 0.00% | 0.00% | 0.00% | 0.00% | 0.00% |

| Degree | 1 | 2 | 3 | 4 | 5 | 6 | 7 | 8 |
|---|---|---|---|---|---|---|---|---|
| -8 | 0.00% | 0.00% | 0.00% | 0.00% | 0.00% | 0.00% | 0.00% | 0.00% |
| -7 | 0.34% | 0.00% | 0.04% | 0.00% | 0.01% | 0.00% | 0.01% | 0.00% |
| -6 | 0.00% | 0.00% | 0.00% | 0.00% | 0.00% | 0.00% | 0.00% | 0.00% |
| -5 | 0.66% | 0.00% | 0.07% | 0.00% | 0.03% | 0.00% | 0.01% | 0.00% |
| -4 | 0.00% | 0.00% | 0.00% | 0.00% | 0.00% | 0.00% | 0.00% | 0.00% |
| -3 | 1.83% | 0.00% | 0.20% | 0.00% | 0.07% | 0.00% | 0.04% | 0.00% |
| -2 | 0.00% | 0.00% | 0.00% | 0.00% | 0.00% | 0.00% | 0.00% | 0.00% |
| -1 | ▓▓▓▓ | 0.00% | 1.83% | 0.00% | 0.66% | 0.00% | 0.34% | 0.00% |
| 0 | 0.00% | 0.00% | 0.00% | 0.00% | 0.00% | 0.00% | 0.00% | 0.00% |
| 1 | ▓▓▓▓ | 0.00% | 1.83% | 0.00% | 0.66% | 0.00% | 0.34% | 0.00% |
| 2 | 0.00% | 0.00% | 0.00% | 0.00% | 0.00% | 0.00% | 0.00% | 0.00% |
| 3 | 1.83% | 0.00% | 0.20% | 0.00% | 0.07% | 0.00% | 0.04% | 0.00% |
| 4 | 0.00% | 0.00% | 0.00% | 0.00% | 0.00% | 0.00% | 0.00% | 0.00% |
| 5 | 0.66% | 0.00% | 0.07% | 0.00% | 0.03% | 0.00% | 0.01% | 0.00% |
| 6 | 0.00% | 0.00% | 0.00% | 0.00% | 0.00% | 0.00% | 0.00% | 0.00% |
| 7 | 0.34% | 0.00% | 0.04% | 0.00% | 0.01% | 0.00% | 0.01% | 0.00% |
| 8 | 0.00% | 0.00% | 0.00% | 0.00% | 0.00% | 0.00% | 0.00% | 0.00% |

As explained with reference to such arrangement as depicted in FIG. 1, the incident light 20 is uniformly split into substantially four diffracted light beams $21_{+1x}$, $21_{-1x}$, $21_{+1y}$, and $21_{-1y}$, yielding no zero-order diffracted light. In certain cases, however, it is desired that the incident light 20 be split into substantially five diffracted light beams $21_0$, $21_{+1x}$, $21_{-1x}$, $21_{+1y}$, and $21_{-1y}$, which means that there is zero-order diffracted light 20 too. To this end, the phase given by the square cell 3 should preferably be shifted a little bit from π. For instance, what happens at a phase of 0.758π that is 24.2% shallower than π is shown in Table 2 similar to Table 1. As can be seen, the intensities of + first-order light $21_{+1x}$, $21_{+1y}$, and − first-order light $21_{-1x}$, $21_{-1y}$ become a little bit weaker and some intensity adds to zero-order diffracted light $21_0$; that is, the intensity of zero-order diffracted light $21_0$ is substantially equal to those of the + first-order light $21_{+1x'}$, $21_{+1y'}$ and the – first-order light $21_{-1x'}$, $21_{-1y'}$ (13.79%). In this way, the incident light 20 is almost uniformly split into five diffracted light $21_0$, $21_{+1x'}$, $21_{-1x'}$, $21_{+1y'}$ and $21_{-1y'}$.

information is recorded along concentric or spiral tracks. Consider here the case where there are three adjoining tracks 51, 52 and 53 as depicted in FIG. 5(a) and four light beams (two + first-order light beams and two – first-order light

TABLE 2

Diffraction efficiency

| Degree | -8 | -7 | -6 | -5 | -4 | -3 | -2 | -1 | ▓ |
|---|---|---|---|---|---|---|---|---|---|
| -8 | 0.00% | 0.00% | 0.00% | 0.00% | 0.00% | 0.00% | 0.00% | 0.00% | 0.00% |
| -7 | 0.00% | 0.01% | 0.00% | 0.01% | 0.00% | 0.03% | 0.00% | 0.29% | 0.00% |
| -6 | 0.00% | 0.00% | 0.00% | 0.00% | 0.00% | 0.00% | 0.00% | 0.00% | 0.00% |
| -5 | 0.00% | 0.01% | 0.00% | 0.02% | 0.00% | 0.06% | 0.00% | 0.57% | 0.00% |
| -4 | 0.00% | 0.00% | 0.00% | 0.00% | 0.00% | 0.00% | 0.00% | 0.00% | 0.00% |
| -3 | 0.00% | 0.03% | 0.00% | 0.06% | 0.00% | 0.18% | 0.00% | 1.58% | 0.00% |
| -2 | 0.00% | 0.00% | 0.00% | 0.00% | 0.00% | 0.00% | 0.00% | 0.00% | 0.00% |
| -1 | 0.00% | 0.29% | 0.00% | 0.57% | 0.00% | 1.58% | 0.00% | ▓ | 0.00% |
| ▓ | 0.00% | 0.00% | 0.00% | 0.00% | 0.00% | 0.00% | 0.00% | 0.00% | ▓ |
| 1 | 0.00% | 0.29% | 0.00% | 0.57% | 0.00% | 1.58% | 0.00% | ▓ | 0.00% |
| 2 | 0.00% | 0.00% | 0.00% | 0.00% | 0.00% | 0.00% | 0.00% | 0.00% | 0.00% |
| 3 | 0.00% | 0.03% | 0.00% | 0.06% | 0.00% | 0.18% | 0.00% | 1.58% | 0.00% |
| 4 | 0.00% | 0.00% | 0.00% | 0.00% | 0.00% | 0.00% | 0.00% | 0.00% | 0.00% |
| 5 | 0.00% | 0.01% | 0.00% | 0.02% | 0.00% | 0.06% | 0.00% | 0.57% | 0.00% |
| 6 | 0.00% | 0.00% | 0.00% | 0.00% | 0.00% | 0.00% | 0.00% | 0.00% | 0.00% |
| 7 | 0.00% | 0.01% | 0.00% | 0.01% | 0.00% | 0.03% | 0.00% | 0.29% | 0.00% |
| 8 | 0.00% | 0.00% | 0.00% | 0.00% | 0.00% | 0.00% | 0.00% | 0.00% | 0.00% |

| Degree | 1 | 2 | 3 | 4 | 5 | 6 | 7 | 8 |
|---|---|---|---|---|---|---|---|---|
| -8 | 0.00% | 0.00% | 0.00% | 0.00% | 0.00% | 0.00% | 0.00% | 0.00% |
| -7 | 0.29% | 0.00% | 0.03% | 0.00% | 0.01% | 0.00% | 0.01% | 0.00% |
| -6 | 0.00% | 0.00% | 0.00% | 0.00% | 0.00% | 0.00% | 0.00% | 0.00% |
| -5 | 0.57% | 0.00% | 0.06% | 0.00% | 0.02% | 0.00% | 0.01% | 0.00% |
| -4 | 0.00% | 0.00% | 0.00% | 0.00% | 0.00% | 0.00% | 0.00% | 0.00% |
| -3 | 1.58% | 0.00% | 0.18% | 0.00% | 0.06% | 0.00% | 0.03% | 0.00% |
| -2 | 0.00% | 0.00% | 0.00% | 0.00% | 0.00% | 0.00% | 0.00% | 0.00% |
| -1 | ▓ | 0.00% | 1.58% | 0.00% | 0.57% | 0.00% | 0.29% | 0.00% |
| ▓ | 0.00% | 0.00% | 0.00% | 0.00% | 0.00% | 0.00% | 0.00% | 0.00% |
| 1 | ▓ | 0.00% | 1.58% | 0.00% | 0.57% | 0.00% | 0.29% | 0.00% |
| 2 | 0.00% | 0.00% | 0.00% | 0.00% | 0.00% | 0.00% | 0.00% | 0.00% |
| 3 | 1.58% | 0.00% | 0.18% | 0.00% | 0.06% | 0.00% | 0.03% | 0.00% |
| 4 | 0.00% | 0.00% | 0.00% | 0.00% | 0.00% | 0.00% | 0.00% | 0.00% |
| 5 | 0.57% | 0.00% | 0.06% | 0.00% | 0.02% | 0.00% | 0.01% | 0.00% |
| 6 | 0.00% | 0.00% | 0.00% | 0.00% | 0.00% | 0.00% | 0.00% | 0.00% |
| 7 | 0.29% | 0.00% | 0.03% | 0.00% | 0.01% | 0.00% | 0.01% | 0.00% |
| 8 | 0.00% | 0.00% | 0.00% | 0.00% | 0.00% | 0.00% | 0.00% | 0.00% |

Figure 3:
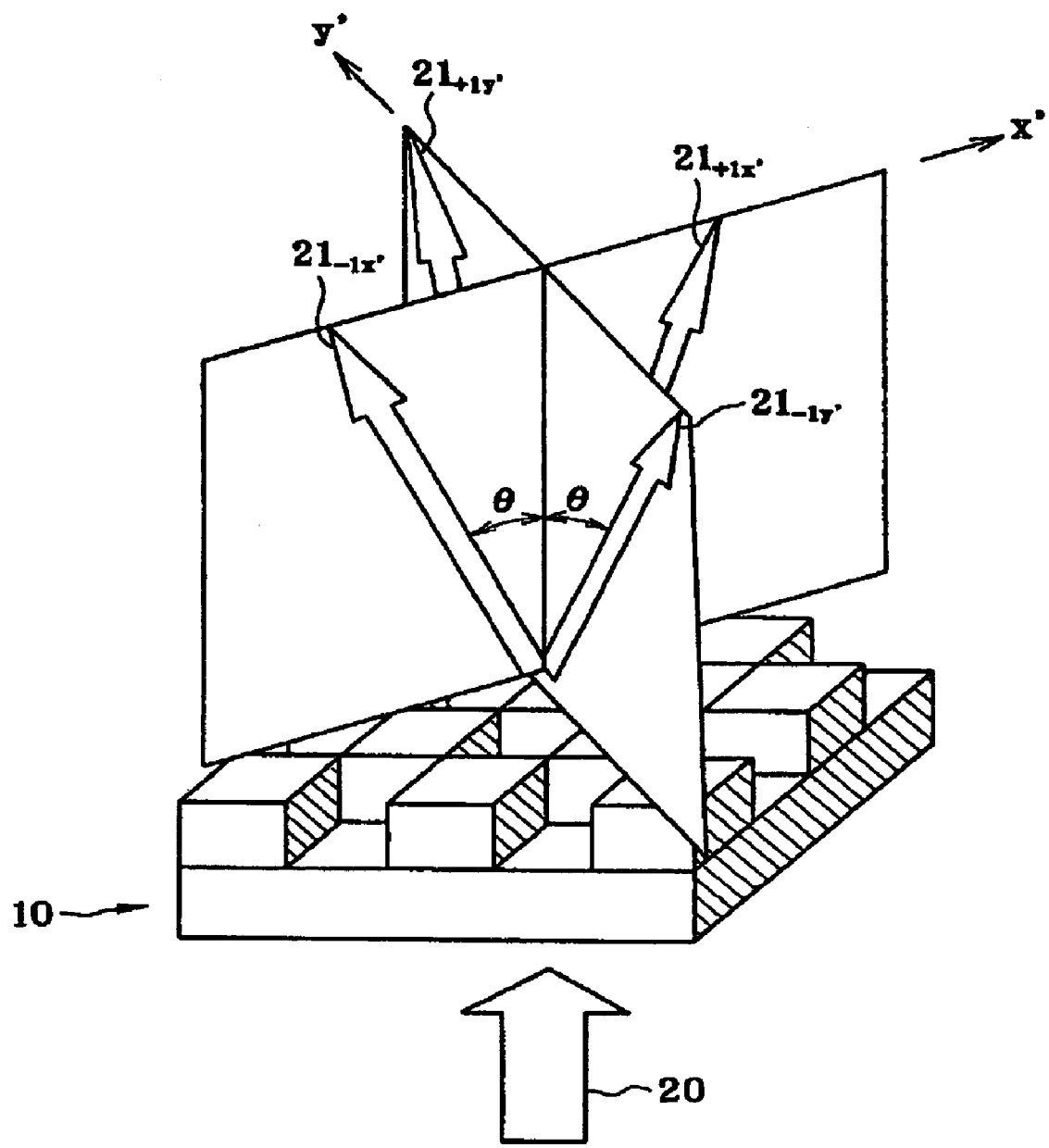
FIG. 3 is illustrative in perspective of how incident light is split into four diffracted light beams by the inventive diffractive optical system.
Figure 4:
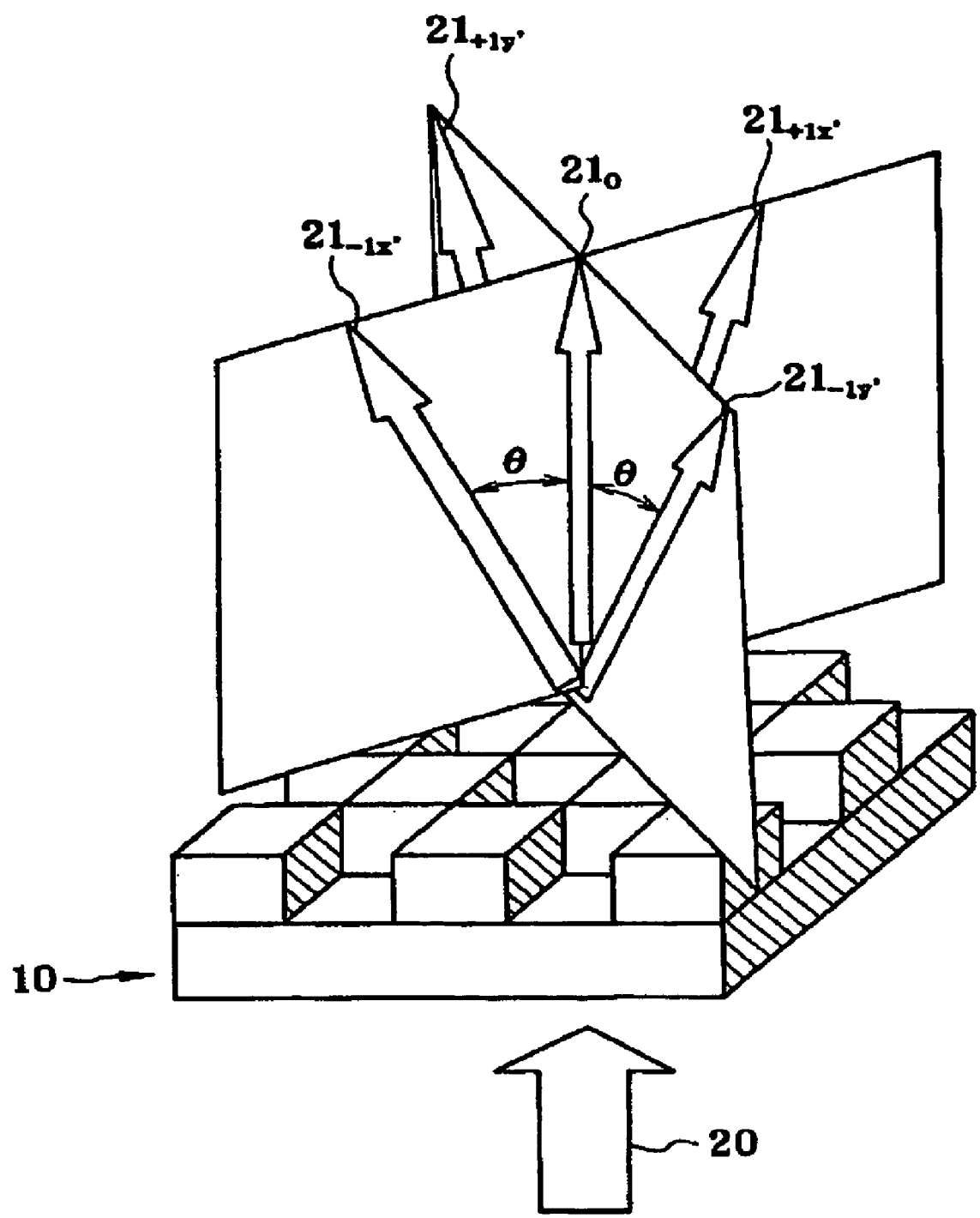
FIG. 4 is illustrative in perspective of how incident light is split into five diffracted light beams by the inventive diffractive optical system.
Figure 5B:
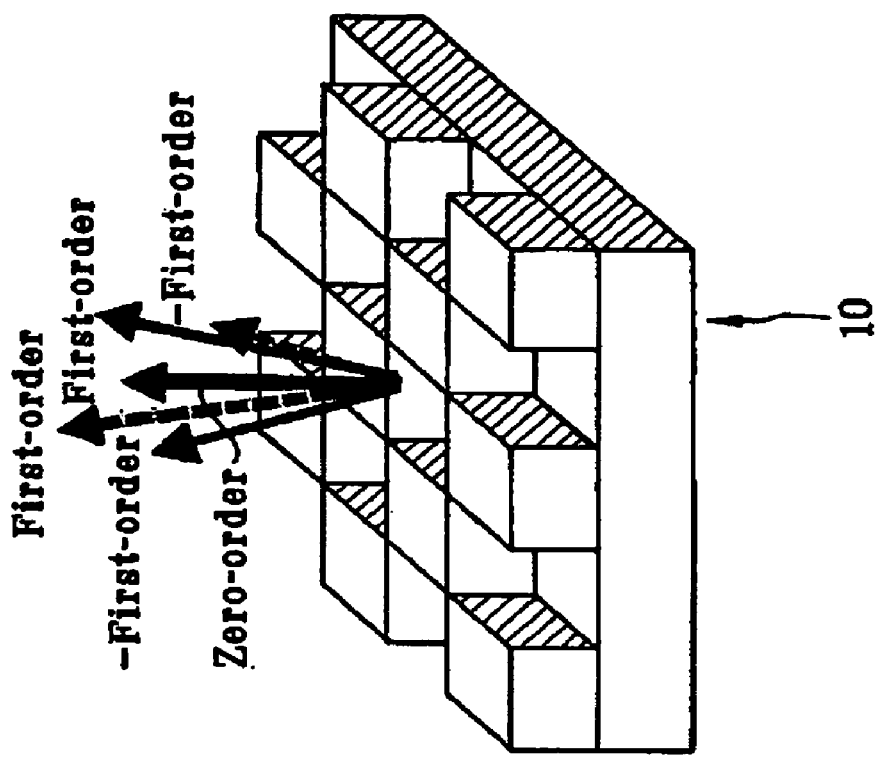
FIGS. 5(*a*) and 5(*b*) are illustrative of why the inventive beam splitter can be used tracking control.
Figure 5A:
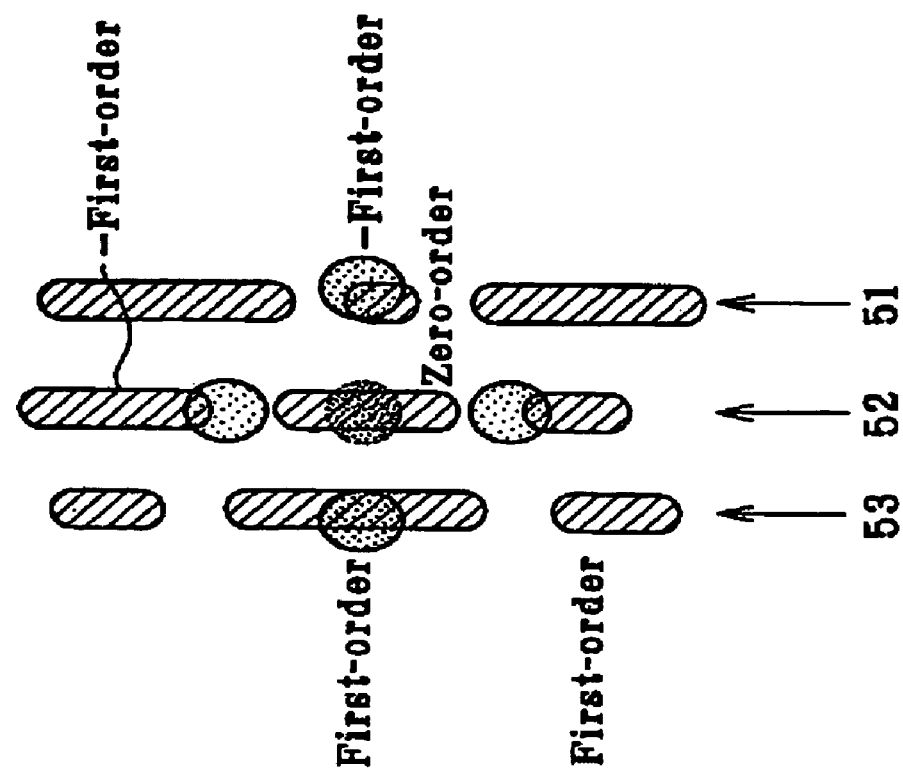

For instance, the inventive diffractive optical system 10 that splits one incident light into four or five light beams as described above may be used as a read head optical element for optical recording media such as CDs or DVDs, wherein beams) or five light beams (one zero-order light beam, two + first-order light beams and two – first-order light beams) come from the inventive diffractive optical system 10 in a split manner as depicted in FIG. 5(b). Of such light beams, the + first-order light beam and the − first-order light beam split in one diagonal direction strike on both outer tracks 51 and 53 of the three tracks 51, 52 and 53. Then, tracking control is effected in such a way that light beams scattered from such tracks become equal and, at the same time, the + first-order light, the − first-order light and the zero-order light split in another diagonal direction strike upon a center track 52. Thus, the information (pits) recorded on the center track 52 is read by the + first-order light and the − first-order light split in another diagonal direction in the case of four light beams (FIG. 3), and the information (pits) recorded on the center track 52 is read by the zero-order light in the case of five light beams (FIG. 4).

Apart from or at the same time as such tracking control as described above, it is possible to learn at which track the read head is depending on the direction or intensity of light scattered from the + first-order light and the − first-order light split in another diagonal direction, as can be seen from a conceptual illustration of FIG. 6. FIGS. 6(*a*) and 6(*b*) are illustrative of the read head is at an inner and an outer CD or DVD track, respectively. When it comes to FIG. 6(*a*), there is a deflection of the direction of scattering by a center track 52 of + first-order light and − first-order light split in another diagonal direction, so that the intensity of the scattered light becomes relatively weak. When it comes to FIG. 6(*b*), by contrast, the direction of scattering by the center track 52 of the + first-order light and − first-order light split in another diagonal direction is so less deflected that the intensity of the scattered light becomes relatively strong. Accordingly, tracking position sensor signals are obtained by way of diagonally two light beams of four or five light beams.

It is understood that the inventive diffractive optical system 10 that splits one incident light into four or five light beams as described above could also be used for laser beam processing where one laser beam, for instance, is simultaneously guided to four or five different sites.

The diffractive optical system 10 of the invention—wherein the minuscule square cells 2 and 3 of the same configuration are arranged in a divided grid pattern in alignment with both the x- and y-axis directions, and such that the square cells 2 and 3 that give phase zero and phase π to reference-wavelength light, respectively, appear alternately in the x-axis direction, and the y-axis direction as well as in alignment with both x'- and y'-axis directions—is now explained with reference to one possible application as a phase shift mask that is used for the fabrication of micro-lens arrays, antireflection structures and so on having a two-dimensional fine periodic structure.

Figure 7A:
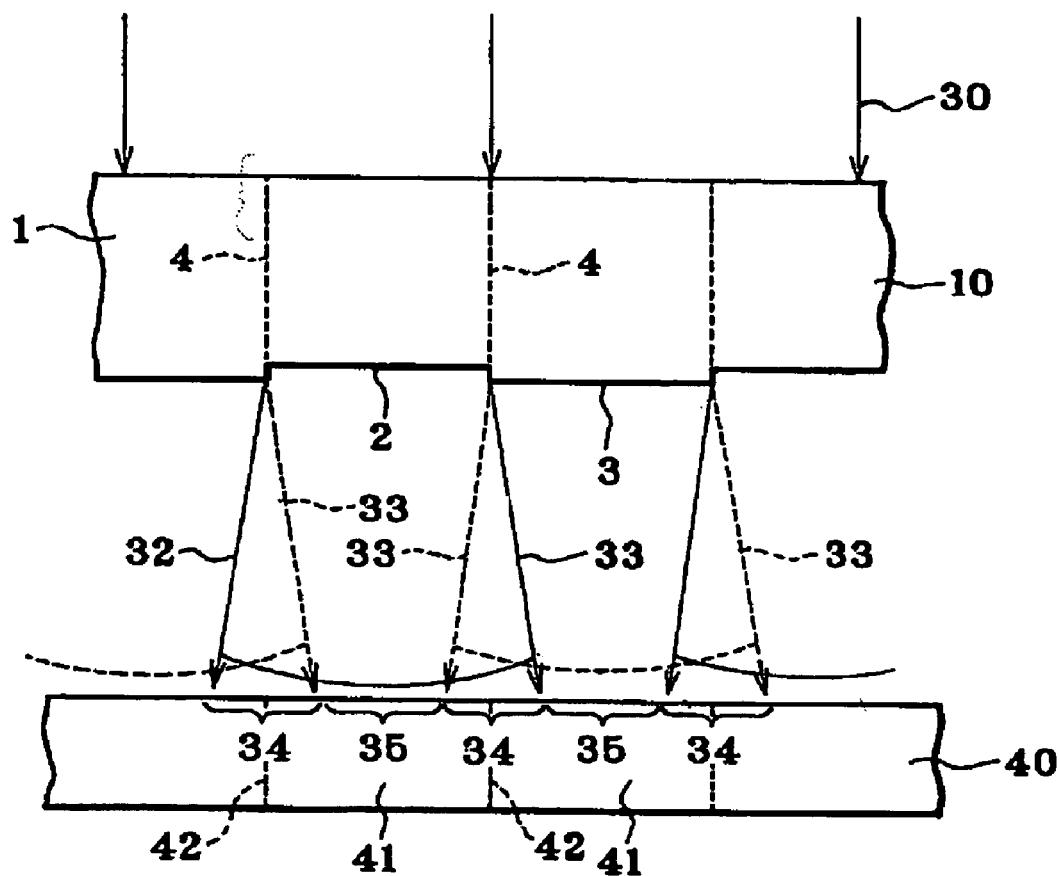
FIGS. 7(*a*) and 7(*b*) are illustrative of how the inventive diffractive optical system acts as a phase shift mask.
Figure 7B:
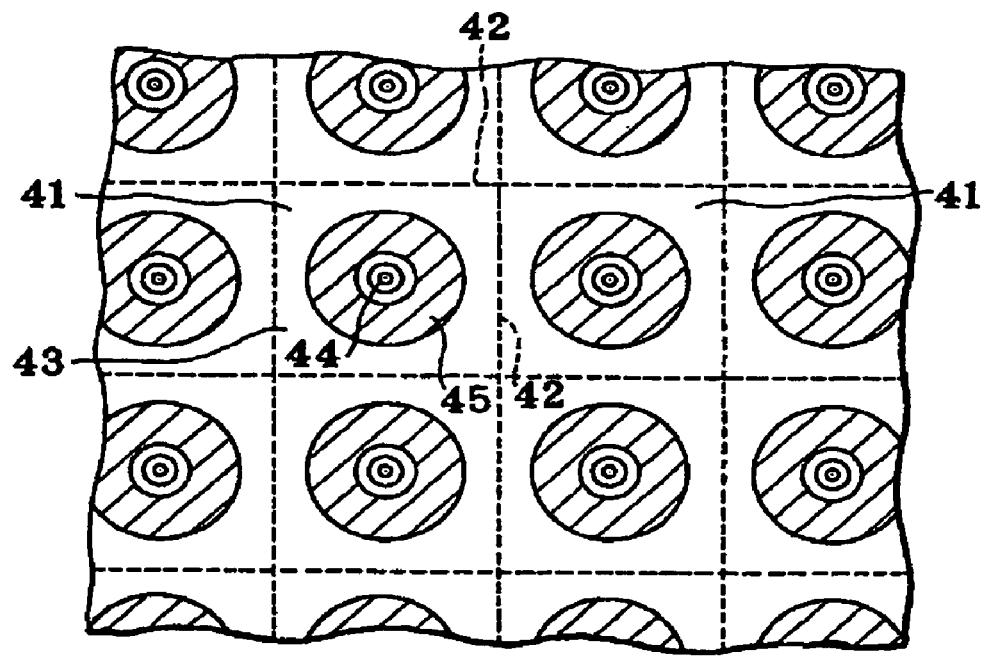

FIGS. 7(*a*) and 7(*b*) are illustrative of how such inventive diffractive optical system 10 acts as the phase shift mask. With parallel illumination light 30 of a given wavelength entering the diffractive optical system 10 from its back surface as shown in FIG. 7(*a*), it is diffracted through the square cells 2 and 3 arranged in the divided grid pattern into diffracted light 32, 33 that spread like spherical waves. At the wavefronts of the diffracted light 32, 33 the frontal amplitude becomes strongest. The diffracted light 32, 33 then strike on a photosensitive material 40 located near to the exit side of the diffractive optical system 10. In the meantime, they interfere while superposed one upon another at an area 34 in close vicinity to a border 4 between the square cells 2 and 3. Between the square cell 2 and the square cell 3 there is a phase difference of π; the diffracted light 33 and 32 from the adjoining square cells 3 and 2 are mutually canceled out at the area 34 to an intensity of nearly zero. On the other hand, diffracted light 32, 33 from the adjoining square cells 3 and 2 do not strike on a center area of the photosensitive material 40 corresponding to each square cell 2, 3 with too strong intensity, so that there is a low exposure in a peripheral area 43 of each square cell 41 near to a border 42 (corresponding to the border 41) between square cells 41 of the photosensitive material 40 corresponding to the square cells 2 and 3, and there is a relatively large exposure in a center area of each square cell 41. In other words, at a center area 44 of each square cell 41, for instance, there is a substantially concentric exposure profile 45 with exposure decreasing with distance from the center. For instance, if a photoresist that differs in the amount of dissolution in a developing solution depending on exposure is used as the photosensitive material 40, therefore, it is then possible to obtain at the surface of the photosensitive material 40 a height profile depending on exposure. If that height profile is copied to a transparent material or the like, it is then possible to obtain a checked pattern of micro-lens array, antireflection structure, photonic structure or the like having a repetitive period having the same length as that of one side of the square cell 2, 3. It is here noted that to fabricate an antireflection structure or photonic crystal for visible region applications, the above phase shift mask is preferably exposed to a shorter, ultraviolet-region reference wavelength $\lambda_0$.

Figure 8A:
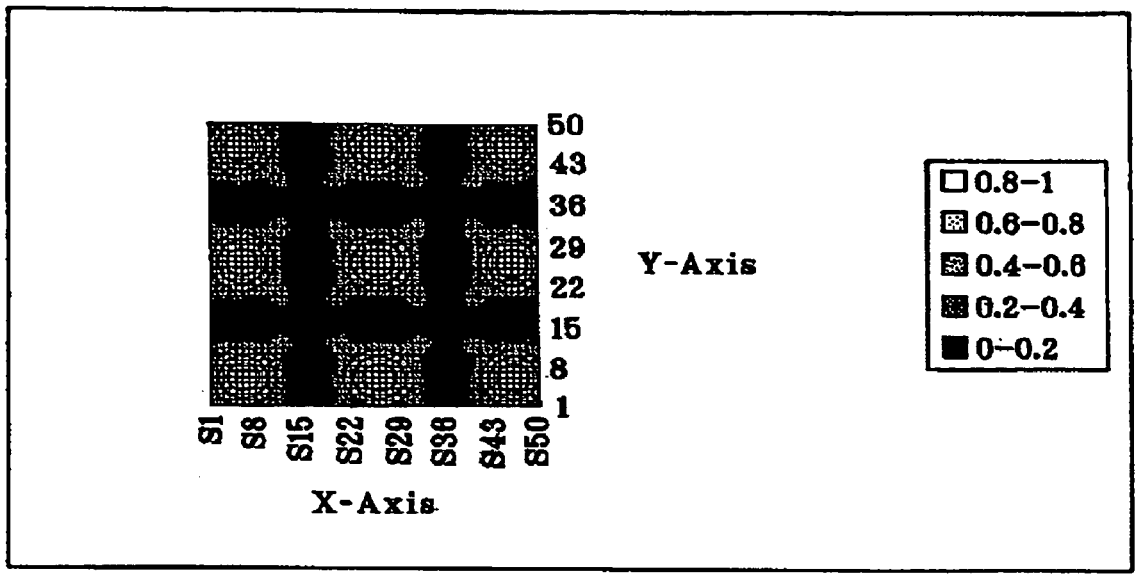
FIGS. 8(*a*) and 8(*b*) are illustrative of one exposure profile with changes in the distance of one embodiment of the inventive diffractive optical system from a phase shift surface.
Figure 8B:
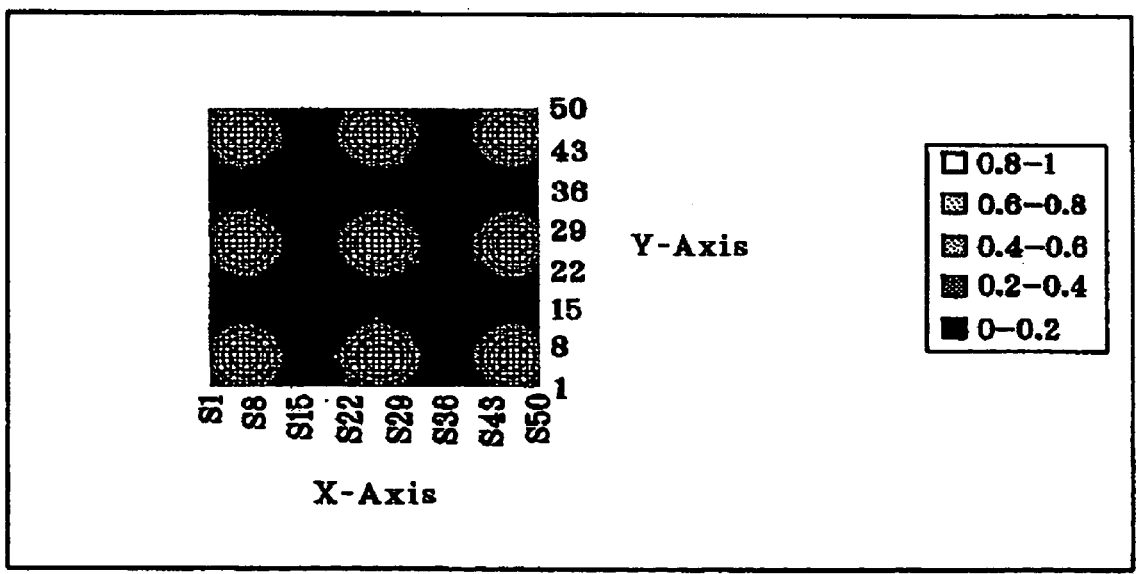
Figure 9:
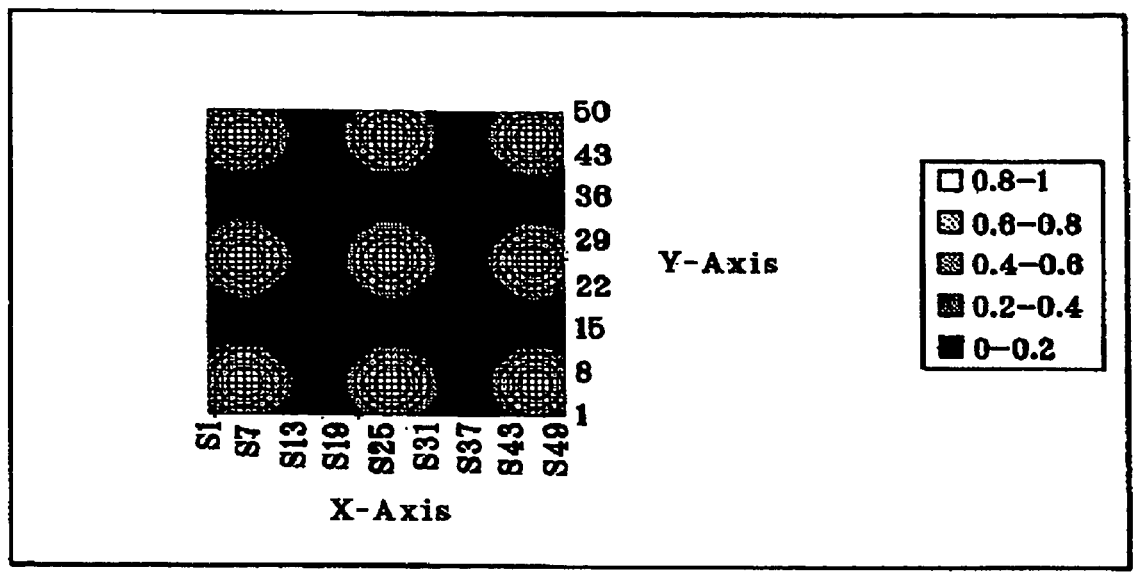
FIGS. 9(*a*) and 9(*b*) are illustrative of another exposure profile with changes in the distance of one embodiment of the inventive diffractive optical system from a phase shift surface.
Figure 9:
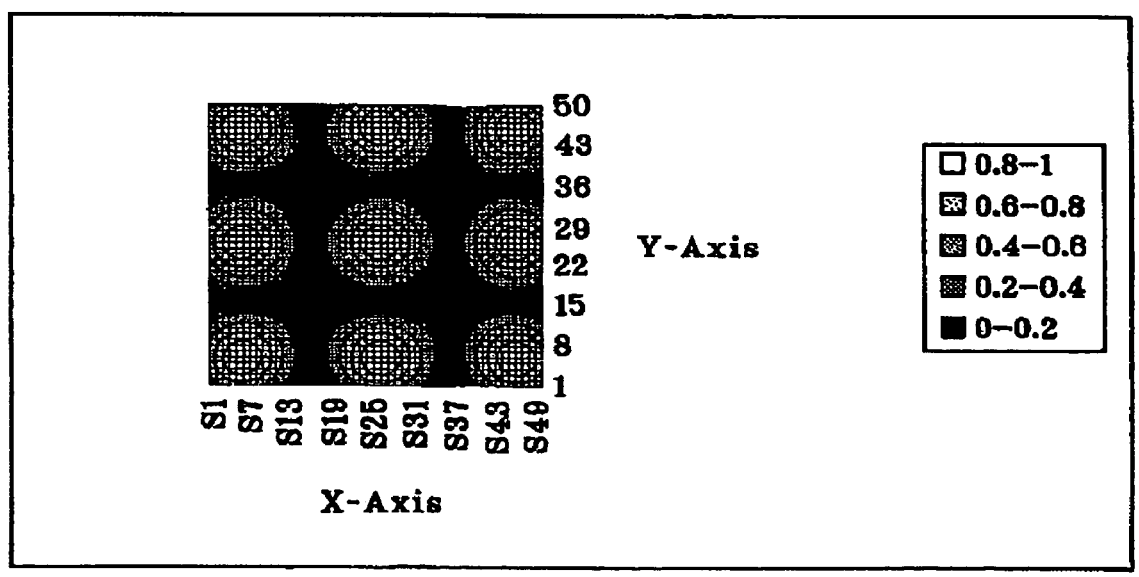

FIGS. 8(*a*) and 8(*b*) and FIGS. 9(*c*) and 9(*d*) are illustrative of exposure profiles 45 in the case of FIG. 2 ($\Lambda$=4 μm, $\lambda_0$=800 nm), upon exposure to light of wavelength $\lambda_0$=800 nm at positions 20-λm, 24-μm, 28-μm and 32-μm away from the phase shift surface (the surface of the transparent substrate 1 with the square cells 2, 3 formed on it) provided that each square cell 3 is configured in such as a way as to give a phase of just π to the wavelength of $\lambda_0$=800 nm. It can be seen that in any position there is obtained an array having a substantially concentric exposure profile where exposure reaches a maximum at the center. Although not shown, it is understood that such a substantially concentric profile is occasionally out of shape between the above positions away from the phase shift surface of the diffractive optical system. Even at other positions, it is possible to obtain a substantially concentric exposure profile where exposure becomes largest at the center.

Figure 10A:
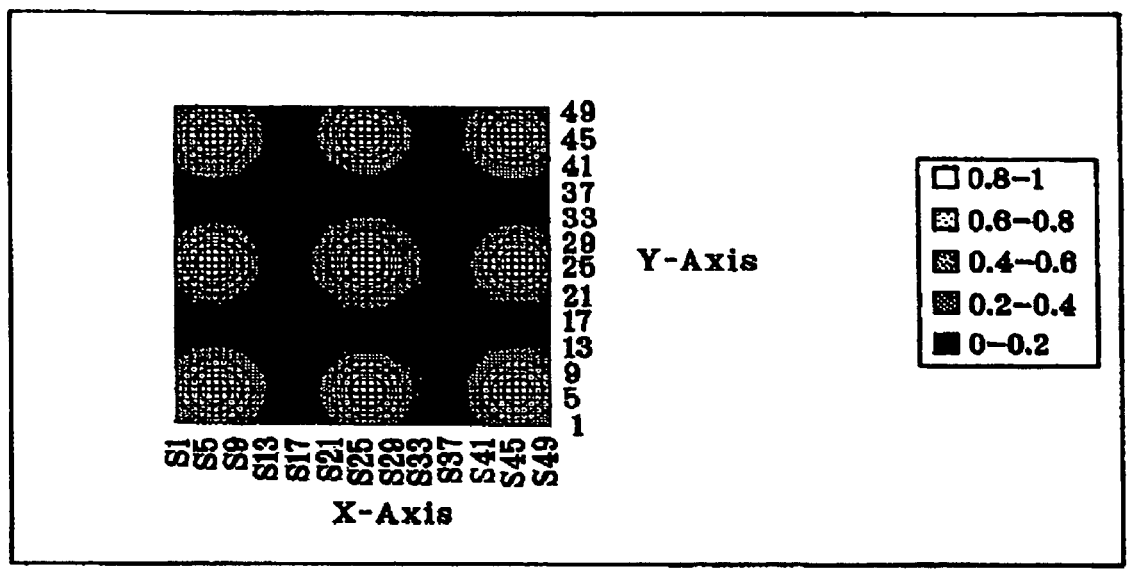
FIGS. 10(*a*) and 10(*b*) are illustrative of one exposure profile with changes in the exposure wavelength of one embodiment of the inventive diffractive optical system.
Figure 10B:
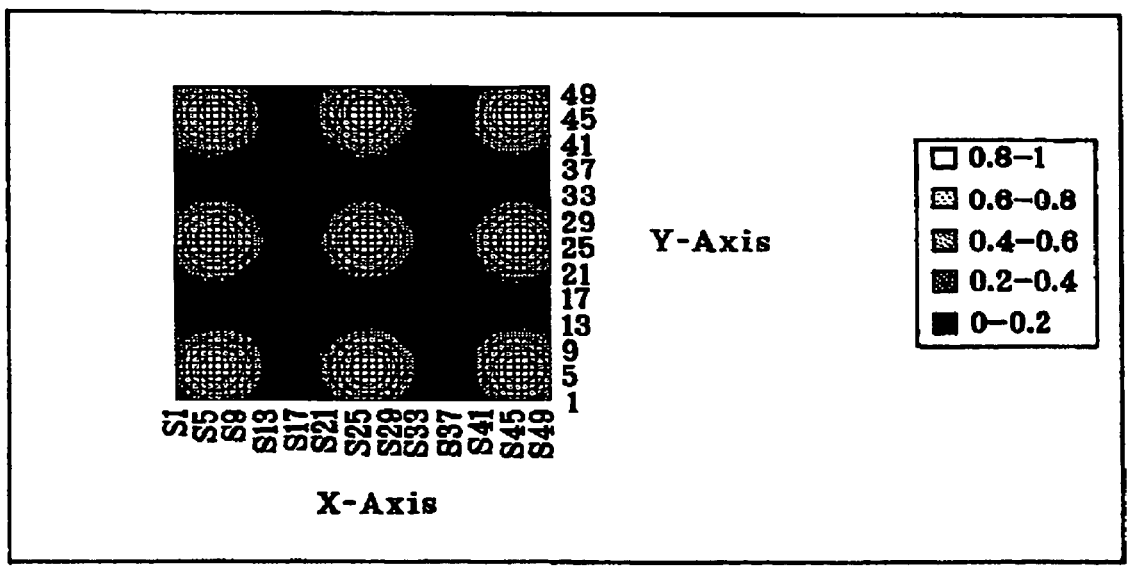
Figure 11A:
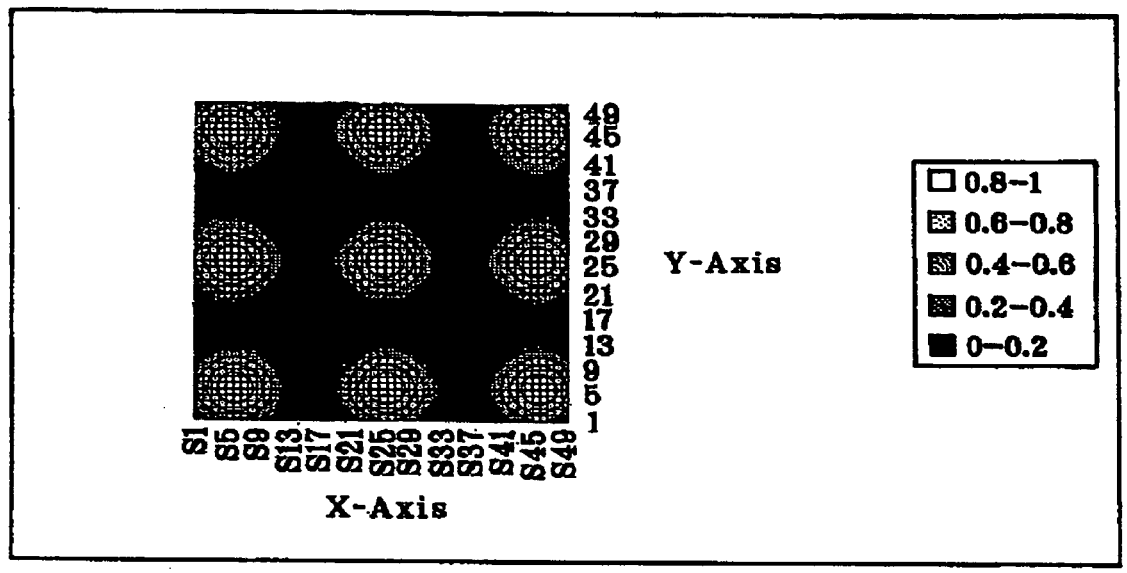
FIGS. 11(*a*) and 11(*b*) are illustrative of another exposure profile with changes in the exposure wavelength of one embodiment of the inventive diffractive optical system.
Figure 11B:
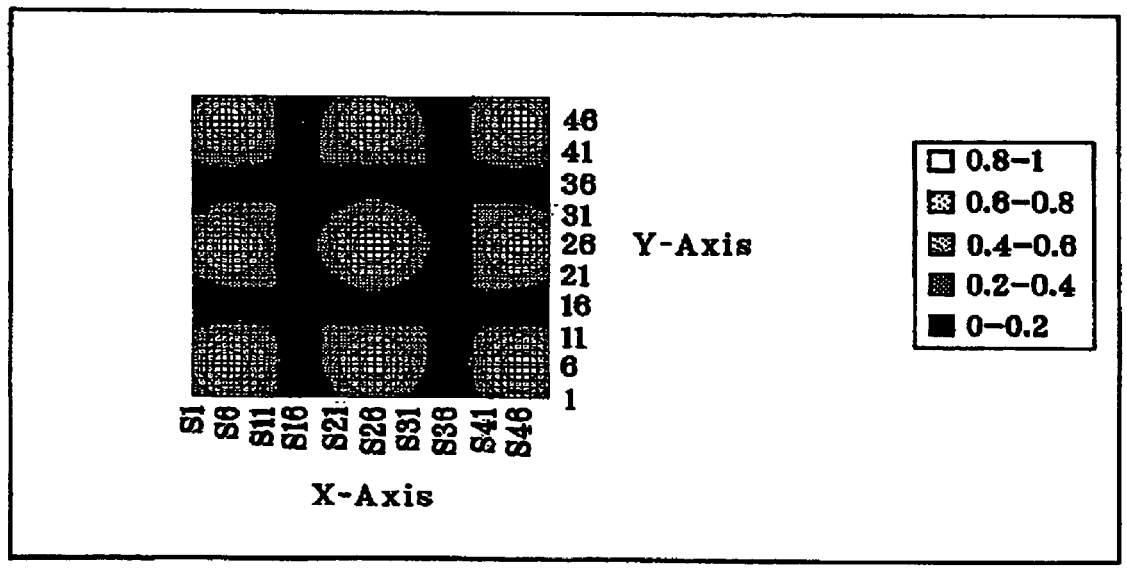
Figure 12:
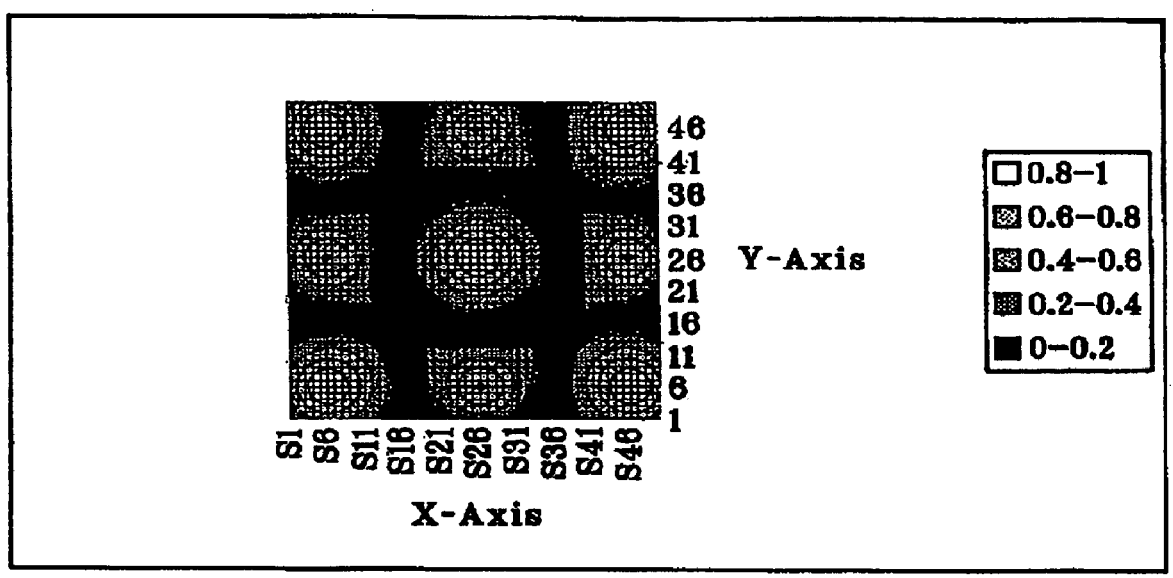
FIG. 12 is illustrative of yet another exposure profile with changes in the exposure wavelength of one embodiment of the inventive diffractive optical system.

FIGS. 10(*a*) and 10(*b*), FIGS. 11(*c*) and 11(*d*) and FIG. 12(*e*) are illustrative of exposure profiles 45 in the case of the diffractive optical system 10 arranged as in FIG. 2 ($\Lambda$=4 μm, $\lambda_0$=800 nm), upon exposure to light of wavelengths of 640 nm, 720 nm, 800 nm, 880 nm and 960 nm at positions 37-μm, 32-μm, 28-μm, 24-μm and 21-μm away from the phase shift surface of the diffractive optical system 10 provided that each square cell 3 is configured in such as a way as to give a phase of just π to the wavelength of $\lambda_0$=800 nm. It can be seen that in any position there is obtained an array having a substantially concentric exposure profile where exposure reaches a maximum at the center.

From these drawings, it is seen that the phase difference between the square cells 2 and 3 with respect to the reference-wavelength light is not necessarily strict; even with an error of the order of π±0.2π, the diffractive optical system of the invention acts well as a phase mask for the fabrication of micro-lens arrays, anti-reflection structures (for instance, see non-patent publication 1) and photonic crystals such as those referred to above.

Referring here to FIGS. 8–12, there is occasionally a slight difference between the exposure profile 45 at the center and the exposure profile 45 at the periphery, because the area of generating diffracted light is limited for calculation. Indeed, as the number of repetition of the square cells 2 and 3 increases as shown in FIG. 2, every exposure profile comes to take the same exposure profile 45 at the center.

Now given that the phase π-giving square cell 3 is thicker by a thickness d than the phase zero-giving square cell 2, it is preferable that:

$$2(n-1)d/\lambda_0 = (2q+1)$$

where n is the refractive index of the medium of the cell 3, and q is an integer that is not necessarily zero. It is neither necessary that the above q be the same for all the square cells 3 on the transparent substrate 1, nor it is required that all the square cells 2 and 3 on the transparent substrate 1 have the same thickness.

Figure 13:
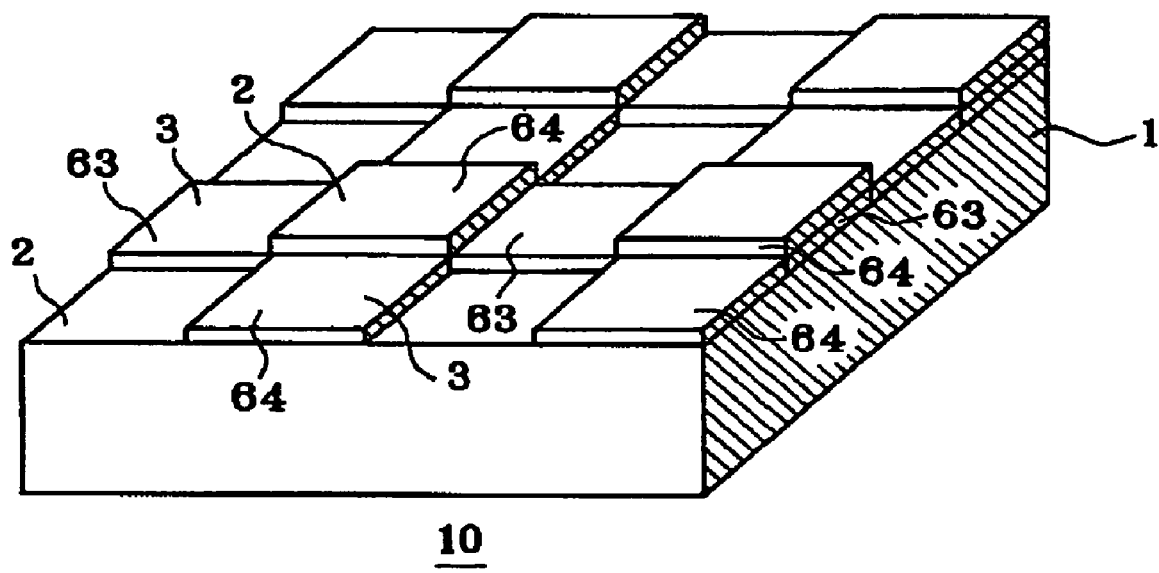
FIG. 13 is a perspective view of another arrangement of the diffractive optical system according to the invention.

FIG. 13 is illustrative in perspective of one exemplary such arrangement. First, a striped form of thin film 63 that satisfies the relation of $2(n-1)d/\lambda_0=(2q+1)$ with respect to the thickness d is formed on the surface of a transparent substrate 1 equidistantly at a pitch twice as large as width in such a way as to extend in the x-axis direction. Then, a striped form of thin film 64 that satisfies the relation of $2(n-1)d/\lambda_0=(2q'+1)$ where q' is an integer with respect to the thickness d is formed on the thin film 63 at the same equidistant interval as in the thin film 63 and a pitch twice as large as width in such a way as to extend in the y-axis direction. In this way, too, it is possible to set up the diffractive optical system 10 of the invention wherein square cells 2 are given by square cells with neither thin film 63 nor 64 formed thereon as well as square cells with both thin films 63 and 64 formed thereon in a superposed manner, and square cells 3 are given by square cells with only one of thin films 63 and 64 formed thereon.

Alternatively, on the surface of the transparent substrate 1 there is first prepared a mask having a striped form of equidistant, parallel apertures extending in the x-axis direction and a pitch twice as large as aperture width. Then, a groove that satisfies the relation of $2(n-1)d/\lambda_0=(2q+1)$ with respect to the thickness d is formed in an unmasked, exposed portion of the surface of the transparent substrate 1 in such a way as to extend in the x-axis direction, followed by removal of that mask. Then, on the surface of the transparent substrate 1 there is formed another mask having the same shape as that of the first mask and a striped form of apertures extending in the y-axis direction. Finally, a groove that satisfies the relation of $2(n-1)d/\lambda_0=(2q'+1)$ where q' is an integer with respect to the thickness d is formed in an unmasked, exposed portion of the surface of the transparent substrate 1 in such a way as to extend in the y-axis direction. In this way, too, it is possible to set up the diffractive optical system 10 of the invention similar to that shown in FIG. 13, wherein square cells 2 are given by square cells with neither of the grooves formed therein as well as square cells with both grooves formed thereon in a superposed manner, and square cells 3 are given by square cells with only one of the grooves formed thereon.

Finally, it is noted that the diffractive optical system 10 of the invention can be obtained with the wavelength λ ranging from 150 nm to 2 μm, and with the square cells 2, 3 having a repetitive pitch Λ ranging from 100 nm to 100 μm.

While the invention has been explained specifically with reference to its principles and embodiments, it is to be understood that the invention is not limited to such embodiments, and could be modified in various manners or fashions. For instance, if a volume hologram photosensitive material is located in close contact with, or in the vicinity of, the exit side of the diffractive optical system 10 of the invention so that a hologram is copied by entering copying illumination light into the photosensitive material from the side of the diffractive optical system 10, it is then possible to fabricate a volume hologram (that is especially capable of splitting light into five light beams) having the same properties as those of the diffractive optical system 10.

What we claim is:

1. A diffractive optical system, comprising a transparent substrate that is divided at a surface in alignment with orthogonal two directions into minuscule square cell groups of the same shape in a checked pattern, wherein square cells that give a phase $2p\pi$ and a phase $\{(2q+1)\pi\pm\delta\pi\}$ where $0\leq\delta\leq0.25$ and p and q are each an integer with respect to reference-wavelength light striking vertically on the surface of the transparent substrate are alternately arranged in each direction, and the phase $2p\pi$-giving square cells and the phase $\{(2q+1)\pi\pm\delta\pi\}$-giving square cells are located in such a way as to be in alignment with 45° diagonal directions of said two directions, wherein the phase $2p\pi$-giving square cells are formed as portions of the transparent substrate having either a first height or a second height relative to a surface of the substrate and the phase $\{(2q+1)\pi\pm\delta\pi\}$-giving square cells are formed as portions of the transparent substrate having a third height relative to the surface of the substrate, the first, second and third heights being different from one another.

2. The diffractive optical system according to claim 1, which is used as a beam splitter for splitting light striking vertically on the transparent substrate into four or five light beams.

3. The diffractive optical system according to claim 2, which is used as means for generating four or five light beams for tracking control for a read head of an optical recording medium wherein information is recorded along concentric or spiral tracks.

4. The diffractive optical system according to claim 2, which is used as means for generating four or five light beams for generation of tracking position sensor signals for a read head of an optical recording medium wherein information is recorded along concentric or spiral tracks.

5. The diffractive optical system according to claim 1, which is used as a phase shift mask for generation of an array of exposure profiles matching with a two-dimensional fine periodic structure.

6. The diffractive optical system according to claim 5, wherein said two-dimensional fine periodic structure is a micro-lens array.

7. The diffractive optical system according to claim 5, wherein said two-dimensional fine periodic structure is an antireflect ion structure.

8. The diffractive optical system according to claim 5, wherein said two-dimensional fine periodic structure is a photonic crystal.

9. The diffractive optical system according to claim 1, wherein said third height is a height having a value between said first height and said second height.

* * * * *